No. 772,349. PATENTED OCT. 18, 1904.
A. J. FARNSWORTH.
POWER TRANSMISSION DEVICE.
APPLICATION FILED FEB. 16, 1903.
NO MODEL. 2 SHEETS—SHEET 1.

Witnesses,
Everitt S. Emery
Thomas B. Booth

Inventor,
Arthur J. Farnsworth,
by Frederick L. Emery
Atty.

No. 772,349. Patented October 18, 1904.

UNITED STATES PATENT OFFICE.

ARTHUR J. FARNSWORTH, OF NEW YORK, N. Y., ASSIGNOR TO RAILWAY ELECTRICAL IMPROVEMENT COMPANY, OF NEW YORK, N. Y., A CORPORATION OF NEW JERSEY.

POWER-TRANSMISSION DEVICE.

SPECIFICATION forming part of Letters Patent No. 772,349, dated October 18, 1904.

Application filed February 16, 1903. Serial No. 143,590. (No model.)

*To all whom it may concern:*

Be it known that I, ARTHUR J. FARNSWORTH, a citizen of the United States, residing at New York, in the county of New York and State of New York, have invented an Improvement in Power-Transmission Devices, of which the following description, in connection with the accompanying drawings, is a specification, like letters on the drawings representing like parts.
My invention consists in improvements in power-transmission devices, and while it is capable of many different applications it is particularly suited to overcome the difficulties heretofore met with in the transmission of power from the axle of a railway-car to some power-consuming device, such as an electric generator in an electric car-lighting system.

My invention will be best understood by the following description and accompanying illustration of one specific embodiment thereof, wherein I have shown its application to the single specific purpose of power transmission from the axle of a railway-car, while its scope will be more particularly pointed out in the appended claims.

Figure 1:
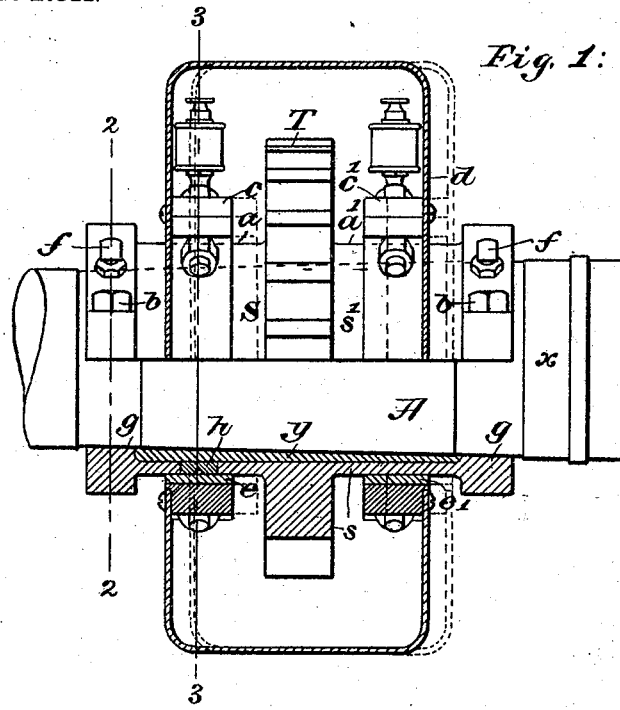
Figure 1:
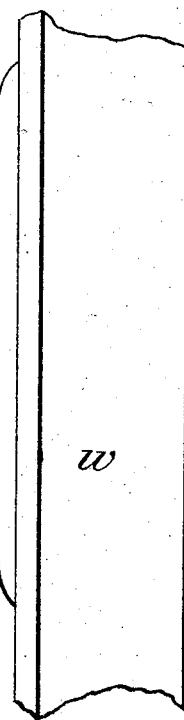
Figure 2:
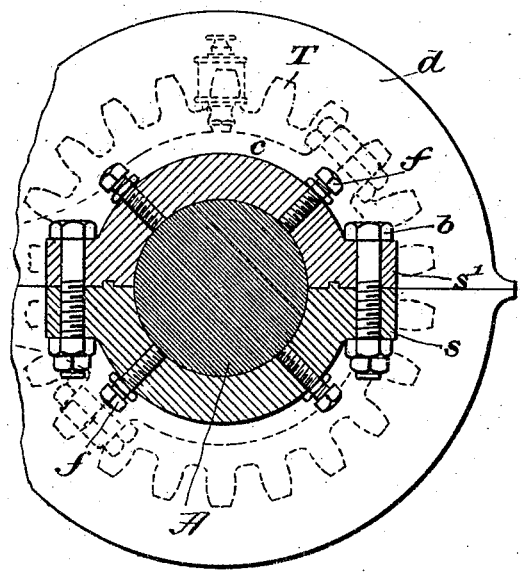
Figure 3:
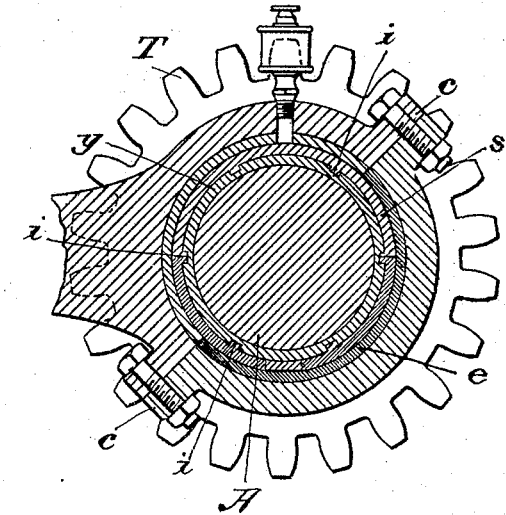
Figure 4:
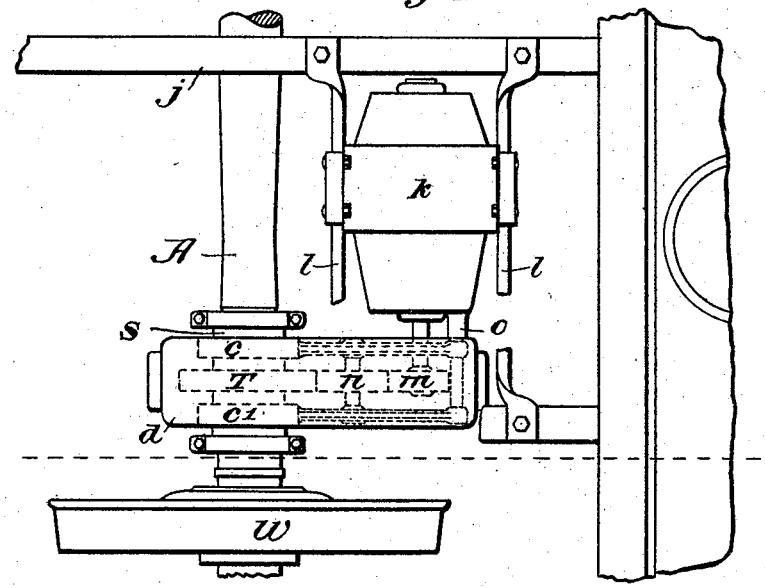
Figure 5:
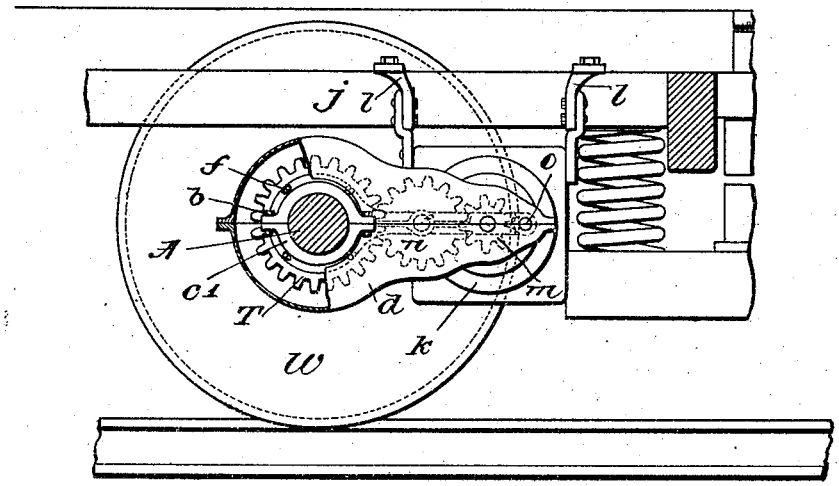

Referring to the drawings, Figure 1 is an elevation, partially in section, showing a tapered car-axle upon which is mounted one form of my improved power-transmission device. Fig. 2 is a section taken on the line 2 2 in Fig. 1 looking from the left. Fig. 3 is a similar section taken on the line 3 3, Fig. 1. Fig. 4 is a plan view showing a portion of a car-truck frame and illustrating the relation between my power-transmission device and the other power-transmission elements associated therewith and with the truck-frame, and Fig. 5 is a side elevation of the structure shown in Fig. 4.
Referring to Fig. 1, W is a representation of a portion of the car-wheel fixedly secured to the car-axle A. As is customary with car-axles used upon steam-railways, this axle A tapers from a point of greater diameter, as $x$, just within the car-wheel to a point of minimum diameter at or near the middle axle portion. (Not shown in Fig. 1.) The transmission member for transmitting power from the car-axle to the power-driven device may be any suitable element, such as a sprocket, pulley, or gear. I have herein shown the same to consist of the gear T, which in the embodiment of my invention herein illustrated forms an integral part of the sleeve S, the latter, together with the gear, preferably being split into two halves or portions $s\ s'$ substantially along a diametrical line and the two sleeve portions being provided with suitable screws or bolts $b$ to clamp the same together when in position upon the axle.

It often becomes necessary to provide journals upon the car-axle for a journaled member associated with the transmission-gear, such as a gear-case, links or arms carrying other portions of the gearing or otherwise associated therewith. Since the car-axle is subject to an end play of considerable amount, ordinarily of from one to one and one-half inches, such journaled member when secured to the truck-frame or other part not undergoing end displacement with the car-axle must itself be capable of end displacement relatively to the car-axle. This requires a straight or parallel bearing portion turned upon the axle or a part secured thereto of a length sufficiently long to provide for the end play thereof. It is obvious, however, that such a straight portion when turned upon the tapered axle weakens it materially, and there are serious objections to cutting away any more than enough of the mere skin or surface of the axle, which is ordinarily a rough forging, to make a finished surface concentric with the axis of rotation and of the same taper as that of the axle.

In the form of my invention shown I have provided upon the hubs of the transmission member T, being herein a part of the sleeve S, suitable parallel bearing-surfaces $a\ a'$ for a journaled member or members, herein shown as the links or arms $c\ c'$, forming a part of my transmission-gear, hereinafter referred to, and carrying the gear-case $d$. These bearing-surfaces greatly exceed in length the width or thickness of the journal-brasses $e\ e'$, through which the links $c\ c'$ bear upon the surfaces $a\ a'$, and thereby afford the necessary end play for the axle, while still providing the desired bearing for any journaled member which does not partake of that end play. These bearing-surfaces are of sufficient length to permit all necessary or ordinary end play of the axle, the relation between the links and the axle in one position when the latter has undergone longitudinal end displacement being indicated in dotted lines in Fig. 1.

In order to properly mount the sleeve and gear upon the shaft or axle, where the objections referred to preclude other than the provision of a taper seat upon the same, I preferably bore the sleeve upon a taper to correspond to the taper of the axle and to fit the seat assumed to have been prepared upon the same. To secure the sleeve upon the axle, I preferably employ set-screws $f\ f$, which when the sleeve accurately fits the taper of the shaft may merely serve the purpose of preventing relative rotation between the sleeve and the axle. It is frequently found desirable, however, to have some means for alining the gear to make the same concentric with the axis of rotation of the axle after the sleeve has been clamped in position about the same without relying upon the accuracy in fit of the tapered sleeve-bore upon the axle-seat. Owing to errors either in boring the sleeve to the precise diameter desired or in determining the exact lateral location of the gear upon the axle, it is not always possible to have the sleeve exactly fit the tapered seat, and, further, it may often be desired to remove the gear and place it upon another axle of slightly-different dimensions. Under such circumstances I preferably employ set-screws to aline the gear, so that it will turn concentrically with the axle. In the present instance I employ the same set-screws $f\ f$ to thus adjust the gear that are employed for securing the same upon the axle, although it will be obvious that these two functions may be performed by the same means or separately by different means and that either or both functions may be performed by means other than those of the specific character shown. By thus utilizing set-screws or other similar means for fixedly securing the gear to the shaft instead of relying entirely upon the clamping-bolts $b\ b$ the gear or sleeve may be bored and the halves brought together with great accuracy by the clamping-bolts $b\ b$. Where the clamping-bolts only are relied upon for securing a split member to a seat upon an axle-shaft, it is impossible to bring the halves accurately together and at the same time exert the necessary clamping effect upon the axle-shaft to keep the split member tight upon the same, this being particularly objectionable where the transmission member consists of a gear. By relying upon the set-screws instead of clamping-bolts I thereby render my power-transmission device interchangeable, for the gear or sleeve, when desired, may be bored a trifle large and lined upon any axle which has a tapered seat approximating its bore through the alining means described. In order to relieve the set-screws of the weight of the transmission member and to further relieve them from such shocks and strains as they might receive through continued severe service, and through which they might in the course of time become loosened, I preferably so construct the sleeve as to provide a space between the same and the axle intermediate the two internal bearing shoulders or flanges $g\ g$, through which the sleeve is seated upon the axle. After the gear has been alined, as described, I may and preferably do fill up the said space on the inside of the gear with a filler of Babbitt metal $y$ or other low fusing and expanding metal, which may be introduced in a fused state through the removable plug $h$. This will not only serve to take up the shocks and blows and support the weight of the gear, but by forming lugs $i$ or similar surface irregularities on the interior of the sleeve to project into the space and the metal therein it also serves to lock the gear upon the axle, relieving to a considerable extent the strain upon the set-screws. For this purpose also instead of turning a seat upon the axle for the entire length of the sleeve or gear small seats at each end only may be turned of a length sufficient to accommodate the internal shoulders of the sleeve, the intermediate portion of the axle being left in its rough and irregular condition, which, particularly in conjunction with the irregularities designedly placed upon the interior of the sleeve, effectually secures the gear upon the axle. The irregularities which occur, either designedly or otherwise, upon the inner surface of the sleeve or the opposing surface of the axle constitute interlocking or retaining walls.

In Figs. 4 and 5 I have shown the form of my improved transmission device described above applied to a car-lighting system. The car-truck frame $j$, having the tapered axle A, carries the electric generator $k$, secured to the frame in any desired manner, as by the transverse straps $l$. Upon the car-axle is a transmission device of the character hereinbefore described, the gear T upon the same being connected to drive the generator-pinion $m$ through the intermediate gear $n$. The latter is supported by the links or arms $c\ c'$, journaled upon the sleeve S and supported at their opposite ends by a pin or stud $o$, secured to the generator-frame, said links or arms having a slightly-elongated eye to permit a sliding movement over the stud $o$, as well as an oscillating movement about the same, as the car-axle undergoes a lateral displacement relatively to the generator-shaft in its upward or downward movement in the truck-frame. This form of gear I have more particularly described in my copending application, Serial No. 142,080, filed February 5, 1903, wherein I have also broadly claimed the same.

It will be obvious that while I have described my improved transmission device in connection with one specific application it is capable of use in various situations, many of which will be evident to those skilled in the art. It will also be evident that the specific details to which I have herein referred are submitted for illustrative purposes only and may be widely varied without departing from the spirit of my invention.

I claim—

1. In a power-transmission system, the combination of a car-axle, a split power-transmission member, means for fixedly securing the same upon said axle, a power-driven device, such as an electric generator, gearing interposed between said driven device and said transmission member, a journaled member upon said power-transmission member associated with said gearing, said car-axle and said journaled member being subject to relative displacement lengthwise the car-axle and suitable bearings upon said power-transmission member for said journaled member to permit said relative displacement.

2. In a power-transmission device the combination of a tapered shaft, a split sleeve having two separated internal bearing-shoulders bored upon a taper to correspond to the taper of said shaft, set-screws for fixedly securing said sleeve to said shaft, and a filler of low fusible metal in the space between said sleeve intermediate said bearing-shoulders.

3. In a power-transmission device the combination of a split sleeve bored upon a taper, set-screws for securing the same upon a tapered shaft, parallel bearings upon said sleeve for carrying a journaled member thereupon, and a power-transmission member also upon said sleeve and intermediate said parallel bearings.

4. In a power-transmission device, a shaft, a sleeve adapted to be secured thereto, a power-transmission member carried by said sleeve, alining means for alining said sleeve and power-transmission member upon said shaft, and a filling of metal having a low fusing-point between said sleeve and shaft.

5. A power-transmission device for use in a car-lighting system, comprising a split sleeve, means for clamping together the separated parts thereof, a power-transmission member upon said sleeve, and parallel bearings on either side thereof.

6. In a car-lighting system, a car-axle, a power-transmission device secured to said axle comprising a split sleeve, a power-transmission member upon said sleeve and parallel bearings also on said sleeve; a driven member driven by said power-transmission member, and a journaled member associated with said driven member journaled upon said bearings and subject to displacement along the same relatively to said sleeve.

7. In a car-lighting system a car-axle, a power-transmission device secured to said axle comprising a split sleeve, a power-transmission member upon said sleeve and parallel bearings also thereupon; a driven member driven by said power-transmission member, intermediate power-transmission means between said power-transmission member and said driven member, and a housing for the protection of said power-transmission means journaled upon said bearings and subject to displacement along the same relatively to said sleeve.

8. In a car-lighting system, a car-axle, a driven shaft, said axle and shaft being subject to relative end displacement, a power-transmission device upon said axle for transmitting power to said shaft, intermediate transmission means between said axle and shaft, and a housing journaled upon said sleeve and protecting said intermediate transmission means.

9. In a power-transmission device, a shaft, a split sleeve upon said shaft, a transmission member upon said sleeve, a journaled member upon said power-transmission device subject to displacement along said shaft, and parallel bearings for said journaled member to permit said displacement.

10. A power-transmission device for a car-lighting system comprising a split sleeve with an integrally-formed power-transmission member, and provided with parallel bearings on either side of said power-transmission member, clamping means for said sleeve, and means for securing the device to a transmission-shaft independently of the clamping thereof.

11. In a power-transmission device the combination with a tapered car-axle, of a split sleeve, means for securing the same to the car-axle, a journaled member subject to displacement lengthwise the axle, and parallel bearings upon said split sleeve upon which said journaled member is permitted to slide longitudinally the axle.

12. In a car-lighting system a tapered axle, a tapered seat turned thereupon, a split sleeve bored upon a taper to correspond to the tapered seat but permitting a slight play thereupon, clamping means for clamping said sleeve about said seat, means independent of the clamping thereof to secure the sleeve upon the tapered seat concentrically with the axis of rotation thereof.

13. In a power-transmission device, a split sleeve, clamping means for clamping together the separated parts thereof, two separated internal bearing portions bored upon a taper within said sleeve, and means independent of the clamping thereof for securing the sleeve to a tapered shaft.

14. In a power-transmission device, a driving-shaft, a split sleeve, means for clamping the separated parts thereof together about said driving-shaft but leaving an intermediate space between said sleeve and said shaft, means for bringing the same concentric with the axis of rotation, a filling substance in said intermediate space and interlocking walls upon which said filling substance acts to aid in securing the sleeve to said shaft.

15. In a car-lighting system a tapered car-axle, a split driving-sleeve secured to said tapered axle and provided with parallel bearings, a power-transmission member upon said sleeve, a driven shaft having both lateral and end displacement relative to said axle, intermediate power-transmission means between said power-transmission member and driven shaft, a pair of links pivoted upon a point fixed relatively to said driven shaft and journaled upon the parallel bearings on said sleeve, and a housing for said transmission means also journaled upon said sleeve.

16. In a car-lighting system a tapered car-axle, a split driving-sleeve secured to said tapered axle and provided with parallel bearings, a power-transmission member upon said sleeve, a driven shaft having both lateral and end displacement relative to said axle, intermediate power-transmission means between said power-transmission member and driven shaft, and a pair of links pivoted upon a point fixed relatively to said driven shaft and journaled upon the parallel bearings on said sleeve.

17. In a car-lighting system a split sleeve having an integrally-formed split driving-gear thereon, parallel bearings upon said sleeve on either side of said gear, a tapered car-axle, means for clamping said sleeve and gear about said axle, and means for alining said sleeve and gear upon said tapered axle.

In testimony whereof I have signed my name to this specification in the presence of two subscribing witnesses.

ARTHUR J. FARNSWORTH.

Witnesses:
LEVI LOBENTHAL,
JOHN J. BOLAND.